July 22, 1969     W. O. CHAPPELL     3,456,376
SPRING-LOADED SPEARING GIG
Filed March 21, 1967     2 Sheets-Sheet 1
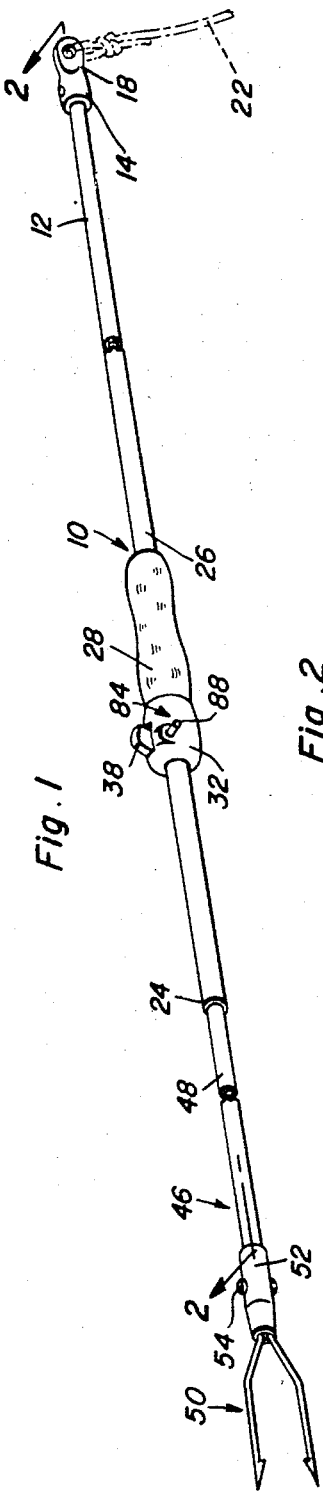
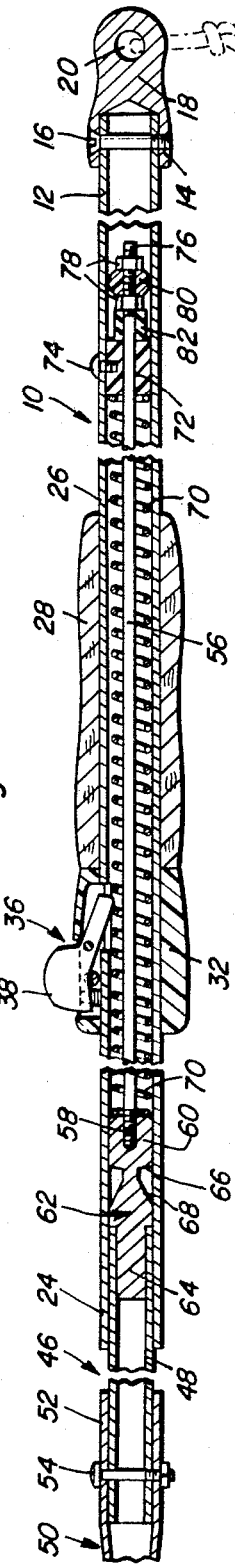
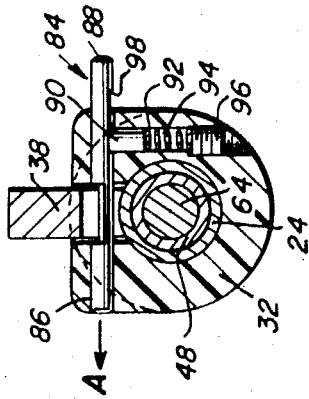
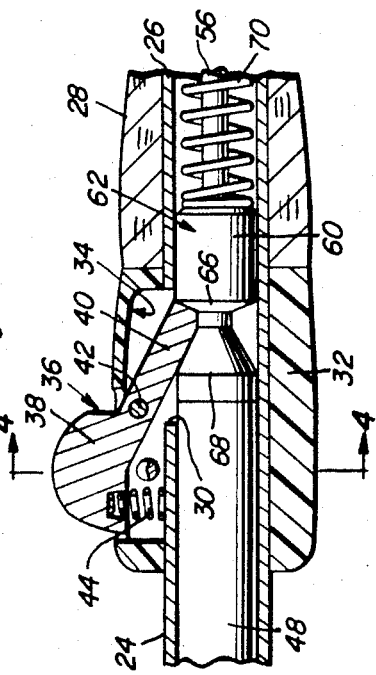
William O. Chappell
INVENTOR.
BY *Clarence A. O'Brien*
*and Harvey B. Jacobson*
Attorneys July 22, 1969 W. O. CHAPPELL 3,456,376
SPRING-LOADED SPEARING GIG
Filed March 21, 1967 2 Sheets-Sheet 2
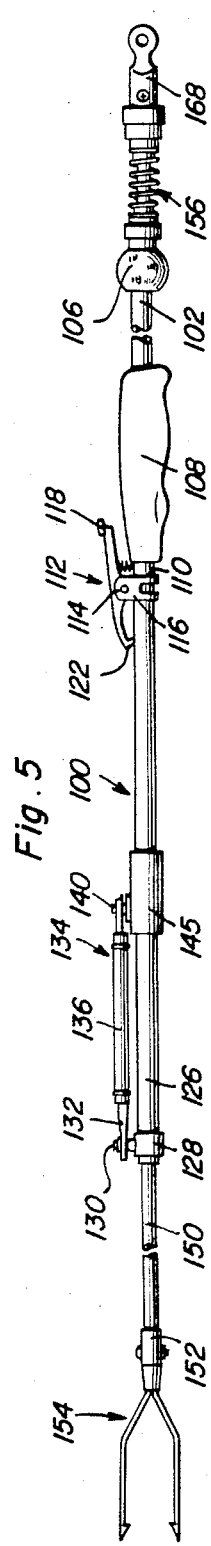
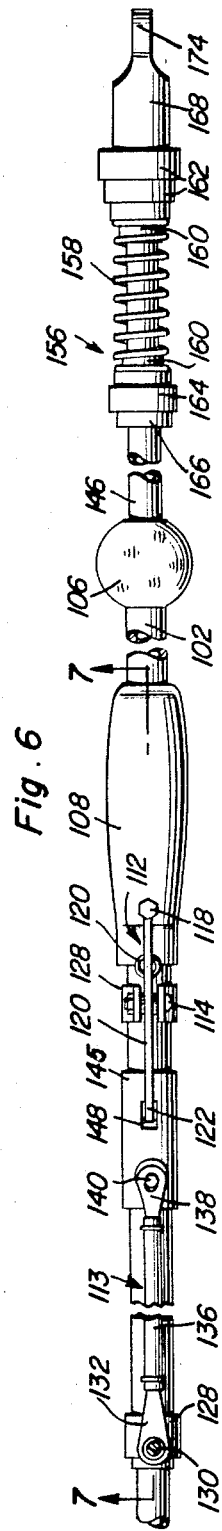
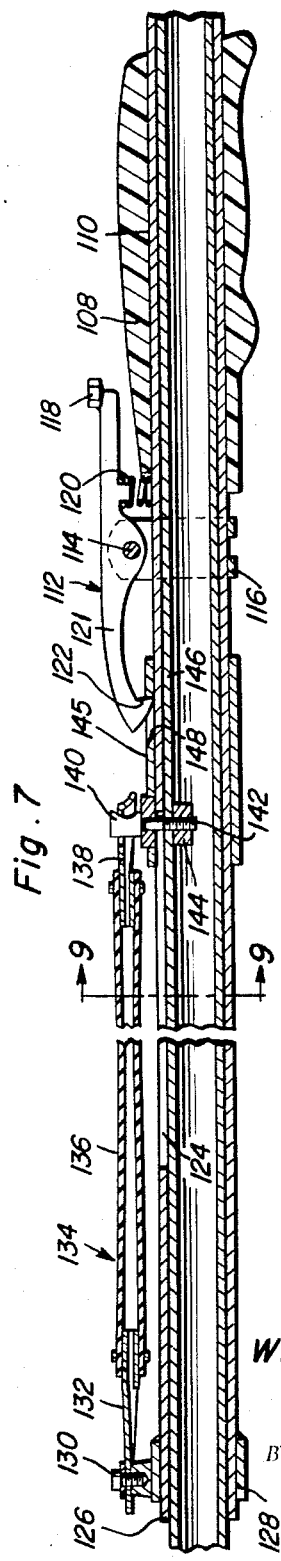
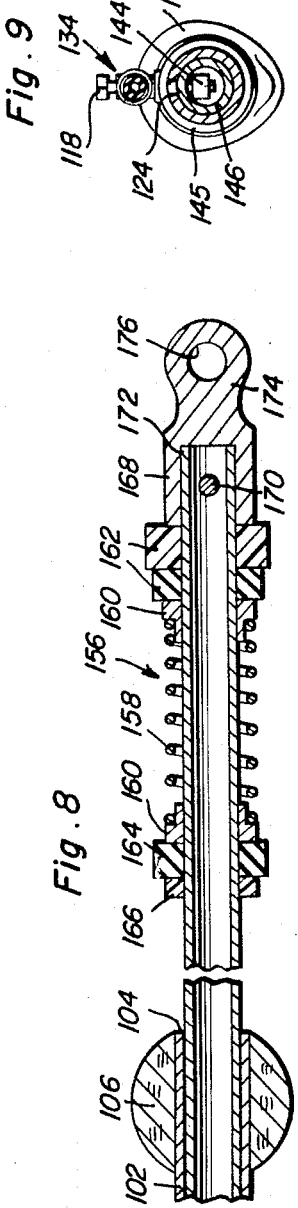
William O. Chappell
INVENTOR.

United States Patent Office 3,456,376
Patented July 22, 1969

3,456,376
SPRING-LOADED SPEARING GIG
William O. Chappell, 200 Mountain View Road,
Anniston, Ala. 36201
Filed Mar. 21, 1967, Ser. No. 624,925
Int. Cl. *A01k 81/04*
U.S. Cl. 43—6           7 Claims

ABSTRACT OF THE DISCLOSURE

A spring-actuated plunger embodies an inner barrel telescopingly slidable in an outer barrel having a contoured handgrip. A spring-biased trigger-latch on the outer barrel is releasably engageable with shoulder means. The forward end of the plunger carries a spear-like gig. Shock absorbing means minimizes objectionable recoil.

Background of the invention

This invention relates to spring-actuated implements designed and expressly adapted to spear and land frogs, fish and the like and classified, broadly stated, as (1) spring-loaded fish and frog gigs or (2) spring-gun-type aquatic animal hunting and spearing weapons.

Prior art

Many and varying forms and styles of spearing gigs have been patented. Accordingly, it is common in this field of invention to telescopingly slidingly mount a spring-actuated plunger (rod or tubular barrel) in a companion outer barrel or cylinder, to use the outer barrel as a handle, and to equip the leading or forward end of the plunger with a target striking fork or spear. The fish spear in the patent to Radiker 2,616,201 exemplifies one prior art adaptation, but comparably construed is distinct and different in that the spear is adapted to be automatically released by the force generated by the impact of the spear with the target, usually a frog or fish, as the case may be. The gig shown in the patent to David 1,727,812 is a second and somewhat more germane citation requiring timed tripping of a manually operable latch-dog or trigger to bring the spring-biased gig into play.

Summary

Two forms or embodiments of the concept are disclosed; one as shown in FIGS. 1–4 and the other in FIGS. 5–9. Generically, the invention comprises an elongated outer barrel which provides a handle with a handgrip and whose bore provides a cylinder for a retractable and projectable plunger. This plunger embodies an inner barrel which is spring-actuated and is slidingly telescopingly mounted in the outer barrel. A spearing fork or gig is carried by the leading end of the plunger while the rearward end is equipped with cushioned bumper-type shock-absorbing means to cope with recoil at the moment the gig strikes the target head on. The plunger is provided with shoulder-equipped setting means which is temporarily held in check by a spring-biased manually trippable trigger or latch dog when the plunger is cocked and set for use.

One embodiment (FIGS. 1–4) is characterized by an enclosed coil spring acting on a rod having end thrust shock-absorbing means designed and adapted to abut a stationary limit stop bushing in the outer barrel. A unique spring-biased trigger and latch finger is provided. Also, a hand set safety device is provided. In the other embodiment (FIGS. 5–9) a distinct trigger or latch dog is used. The spring means here is different, is exteriorly arranged and comprises a tough, strong elastic (latex rubber) tube. The shock-absorbing means is located at the rear and a trippable trigger latch on the handle is unique. Accordingly, the objective, generally speaking, is to improve on known prior art gigs and spears, to better solve significant aspects of the over-all problem, and, in so doing, to advance the art of spring-actuated frog gigs.

These together with other objects and advantages which will become subsequently apparent reside in the details of construction and operation as more fully hereinafter described and claimed, reference being had to the accompanying drawings forming a part hereof, wherein like numerals refer to like parts throughout.

Description of the drawings

FIG. 1 is a view in perspective of a spring-loaded frog gig constructed in accordance with the principles of the present invention.

FIG. 2 is a central longitudinal sectional view on an enlarged scale with parts in section and elevation and parts broken away and taken on the plane of the section line 2—2 of FIG. 1.

FIG. 3 is an enlarged fragmentary view in section and elevation detailing a spring-biased trigger and showing the latch finger or dog engaging the shoulder means of the plunger.

FIG. 4 is a cross-section on the plane of the section line 4—4 of FIG. 3.

FIG. 5 is a view in side elevation, similar to FIG. 1, but showing the modified form of the invention with the spring means and also the shock-absorbing means exteriorly arranged.

FIG. 6 is an enlarged top plan view with parts broken away and showing all essential component parts and also showing the plunger cocked.

FIG. 7 is a view on a further enlarged scale with parts in section and elevation and detailing the spring means and trigger means.

FIG. 8 is an amply enlarged sectional view detailing the cushioned shock-absorbing means.

And FIG. 9 is a cross-section on the plane of the section on the plane of the section line 9—9 of FIG. 7.

Description of the preferred embodiments

By way of introduction to the description of the details it is reiterated that one embodiment including the safety device is shown in FIGS. 1–4 inclusive. The other embodiment is disclosed in FIGS. 5–9 inclusive. Referring first to FIGS 1–4 it will be noted that the linearly straight outer cylindrical barrel is denoted by the numeral 10 and defines a handle and also a cylinder. The rearward end portion 12 (FIG. 2) is closed by a cap 14 removably secured in place by a suitable fastener 16 and provided with a lug or ear 18 with an eye 20 to accommodate a rope, chain or the like 22. The forward open end of the barrel is denoted at 24 and the median portion at 26. It is on this portion 26 that a cork or buoyant suitably contoured handgrip 28 is fixedly mounted. Directly in front of the handgrip there is a clearance slot 30 (FIG. 3). A sleeve-like trigger mounting adapter 32 of suitable size, shape and material is fastened in place as shown in FIG. 3 and has a hollow or chamber portion 34 registering with the slot 30. This mounting service to accommodate the manually depressible trigger 36 comprising a press-button 38 and a trigger finger or latch dog 40 which is pivoted in place at 42. A suitably tensioned coil spring 44 is provided and the tendency of the spring is to urge the finger 40 inwardly through the slot 30 in an evident manner. The coacting reciprocal plunger is denoted by the numeral 46 and it comprises an elongated inner barrel 48 which is telescopingly slidable into the outer barrel and which is provided on its forward or leading end with a frog and fish impaling gig denoted generally by the numeral 50 and of suitable construction and having a socket or ferrule 52 fitting over the barrel and bolted or otherwise secured in place as at 54. The rearward part of the plunger comprises a rod 56 having a screw-threaded forward end portion 58 joined to a cylindrical component guide 60 of the coupling 62, that is, the coupling which joins the rod with the inner barrel. To this end the coupling has an appropriate shank 64 fitting and secured in the inner barrel as shown for example in FIG. 2. This coupling is also referred to generally as cocking and shoulder means and one shoulder is denoted at 66 and when aligned with the slot 30 serves to accommodate the trippable latch finger or dog 40 as shown in FIG. 3. The other component of the shoulder means is a tapering cone 68 which defines an appropriate endless or annular clearance channel for the finger 40 in the manner and for the purposes illustrated in FIG. 3. The spring-loading feature of the plunger comprises an appropriate coiled compression spring 70 which encircles the rod and bears at one end against the coupling 62 as shown in FIGS. 2 and 3. The other end bears against a guide bushing 72 which is fitted in the outer barrel and is secured by a fastening screw 74. This bushing serves not only as a guide for the rod but as a limit stop for the cushioned shock-absorbing means. To accomplish the desired result the rearward end portion of the rod is screw-threaded as at 76 to accommodate assembling and retaining nuts 78 for an intervening washer-like guide 80. The construction also includes a rubber bumper or collar 82 which is interposed between the bushing and adjacent nut and which is adapted to yieldingly abut the limit stop bushing in the manner shown in FIG. 2 and which therefore provides the recoil compensating feature which is desirable at the time that the fork or gig 50 contacts the target.

It will be obvious that by retracting the plunger, that is, telescoping it into the outer barrel the shoulder means 66 registers with the slot 30 at which time the spring 44 comes into play and sets the latch finger and consequently cocks the implement and readies it for use. When depressing the button 38 against the tension of the spring 44 the latch finger 40 comes into play, releases from the shoulder means and the coil spring 70 then functions to project the plunger when contact with the target is made.

The optional safety device is shown in FIG. 4 and comprises a lateral safety pin 84 which is manually shiftable from right to left (FIG. 4) in a suitable bore 86. Pushing the end 88 with the finger will slide the pin in the direction of the arrow A to apply the stout portion of the pin and to restrict the movement of the latch finger or dog 40 in what is believed to be an obvious manner. A detent 90 is mounted in a bore 92 and pressed in place by coil spring 94 which is held in assembled relation by a plug screw 96 in the bore. The detent is engageable in a keeper notch 98 which limits the sliding of the safety pin 84 in a direction from right to left and vice versa.

The construction and mode of use of this embodiment of the invention (FIGS. 1–4 inclusive) is believed to be self-evident. On the other hand it will be evident that the success or lack of success in spearing aquatic animals will depend to a large extent on the skill and experience of the user.

Referring now to the modification in FIGS. 5–9 it will be evident that many of the component parts are basically the same as already described. The outer elongated handling barrel is denoted by the numeral 100, the rearward end portion being denoted at 102 in FIG. 8 and which provides a limit stop 104 and which is provided with a buoyant float or ball 106 to assist in floating the implement in case it is accidentally dropped in the water. An appropriately contoured handgrip 108, either of plastic or cork is fixedly mounted on the median portion 110. The trigger means is here shown at 112 and has an intermediate portion pivotally mounted at 114 on a bracket 116 immediately in front of the handgrip 108 (FIG. 7). The rearward end portion of the trigger has a fingerpiece or button 118 to depress the coil spring 120. The latch arm or finger is denoted at 121 and terminates in a detent or dog 122. As shown in FIG. 7 there is an elongated slot 124 and the forward open end of the outer barrel is denoted at 126. A fixed collar 128 is provided at this point and is equipped with a post 130 to which a connector 132 is connected in the manner detailed in FIG. 7. This connector is provided at one end of a tough suitably tensioned elastic tube 134 which constitutes the spring-actuating means, the tube being denoted independently at 136 and having a connector 138 at its right hand end as shown in FIG. 7 which in turn is mounted on a second post 140 including a screw-threaded shank 142 held in place by a nut 144, said shank and nut being joined to the telescoping inner barrel 146. This post or bolt is slidable in the slot 124 from right to left when the trigger is tripped. The bolt is also connected to a cocking sleeve 145 which is shiftable on the slotted outer barrel and which has a keeper seat or shoulder 148 with which the latch dog is releasably engageable. The device here can be cocked by catching hold of the cocking sleeve 145 or it would be permissible to otherwise retract or force the inner barrel into the outer barrel by actually catching hold of the forward end portion 150 of the outer barrel. The portion 150 carries a ferrule 152 which in turn is provided with the fork or gig 154. In this arrangement instead of housing or confining a coil spring in a barrel as shown in FIG. 2 the spring means 134 is on the exterior. Manifestly when the barrels are adjusted relative to each other so that the spring tube 136 is stretched lengthwise and when the cocking or setting sleeve 145 is moved to the position shown in FIG. 7 the spring-biased latch dog automatically engages the shoulder means or keeper 148 and the device is set for use. Simply depressing the button 118 against the tension of the spring 120 releases the latch dog and the cocking sleeve 145 which in turn permits the plunger to come into play and to cause the properly aimed fork or gig 154 to impale or strike the target. In this arrangement the safety device (FIG. 4) is omitted. On the other hand, shock-absorbing means is provided to cope with recoil at the moment the gig comes into contact with the target. The shock-absorbing means here is also externally arranged and comprises a device which is generally denoted at 156 (FIG. 8). This device comprises a coil spring 158 mounted between collars 160 which are assembled and held in place by washers 162 at the right (FIG. 8) and a similar washer 164 at the left which has associated therewith a compressibly resilient cushioning washer 166. This shock-absorbing device is held against displacement by a closing cap 168 fastened at 170 on the open end portion 172 of the outer barrel, said cap provided with an ear or lug 174 having an aperture 176 to accommodate a rope or chain (not shown) and similar to the one shown in phantom lines in FIGS. 1 and 2.

In both the implements shown the handgrip means is on the median portion of the outer barrel and is balanced and adapted for one-handed use. It follows that the implement, also sometimes referred to as a gun, is employed in a manner similar to aquatic animal spearing guns some of which are concurrently in use.

What is claimed as new is as follows:

1. For use when hunting or fishing, an aquatic animal spearing and catching implement capable of being aimed and controllably handled by hand and comprising: an elongated outer barrel constituting and providing an aiming, reaching, thrusting and manually manipulable handle and the bore therein being longitudinally straight and providing a cylinder, said barrel being open at its forward end and having a cap secured to and closing its rearward end, said cap having an apertured ear for the attachment thereto of a safety rope, a median portion of said barrel having a latch accommodating slot, a trigger mounting sleeve surrounding the slotted portion of and fixed to said outer barrel, a spring-tripped trigger pivotally mounted on said sleeve and having a latch projecting inwardly through said slot into the bore of said cylinder, said sleeve having an adapter slot and said trigger having a press-button operable in said adapter slot, a buoyant handgrip fixed on said barrel, a spring-tripped trigger pivotally mounted on said sleeve, a retractable and projectable plunger characterized by an inner barrel telescopingly slidable in the bore of the outer barrel and having a forward end portion provided with fork means, a guide bushing fixedly mounted in a rearward end portion of the bore of said outer barrel, a rod guidingly slidable in said guide bushing, a coil spring encircling said rod and confined in the bore of said outer barrel, and coupling means between the rod and a rearward end of said inner barrel, said coupling means having a cocking shoulder, said latch being releasably engageable with said shoulder.

2. The combination according to claim 1 and, in combination therewith, a safety latch pin, means mounting said latch pin on said outer barrel in cooperating relationship with said spring-tripped trigger, said safety pin being cooperable with and restricting movement of said latch in a manner to prevent the user from accidentally tripping said trigger.

3. For use when hunting or fishing, an aquatic animal spearing and catching implement capable of being aimed and controllably handled by hand and comprising: an elongated outer barrel constituting and providing an aiming, reaching, thrusting and manually manipulable handle and the bore therein being longitudinally straight and providing a cylinder, a median portion of said barrel having a handgrip fixedly mounted thereon, a retractable and projectable plunger embodying an inner barrel telescopingly slidable in said cylinder and having a forward end implemented with a coacting target striking, thrusting and landing gig and a rearward end equipped with bumpertype shock absorbing recoil compensating means oriented to yieldingly abut a relatively stationary component of said outer barrel when said gig contacts the target, said plunger being provided with spring-actuated plunger ejecting means and also shoulder means for retracting and cocking the plunger when it is set for use, and trigger means pivotally mounted on said outer barrel and embodying a manually trippable latch dog which when set is releasably cooperable with said shoulder means, said spring-actuated means and said shock-absorbing means being located accessibly exteriorly with respect to said outer barrel, said spring-actuated means being characterized by an elongated elastic tough rubber tube of requisite tension having one end secured to a first anchoring post fixed on a forward end of said outer barrel and its other end secured to a second anchoring post, said shoulder means including a shouldered cocking sleeve shiftably slidable on said outer barrel, said second post being secured to said cocking sleeve, being reciprocable in a slot provided therefore in said outer barrel, and having an end portion connected with said inner barrel.

4. The structure defined in and according to claim 3 and wherein said sleeve is provided with a keeper hole constituting and providing the aforementioned shoulder, and said trigger means embodying a spring-biased latch dog releasably engaging in said keeper hole and having a readily accessible and depressible button-like finger-piece.

5. An animal spearing implement comprising an elongated outer barrel, the bore of said barrel being straight and providing an elongated cylinder for a reciprocable plunger, said barrel being open at its forward end and closed at its rearward end, a median portion of said barrel having a latch accommodating slot, a spring-tripped manually manipulable trigger pivotally and operatively mounted on said barrel and having a terminal latch dog projecting inwardly through said slot and into the bore of said cylinder and also having an exteriorly disposed press-button, a handgrip fixed on said barrel adjacent said trigger, a retractable and projectable plunger embodying an inner barrel telescopingly slidable in the bore of said outer barrel and having a forward end portion provided with fork means, a guide bushing fixedly mounted in a rearward end portion of the bore of said outer barrel, a rod in said bore guidingly slidable in said guide bushing, a coupling reciprocable in said bore and interposed between and operatvely connected at a forward end to a rearward end of said inner barrel and at a rearward end to a cooperating forward end of said rod, said coupling having a reduced median portion constituting a cocking and retaining shoulder, said latch dog being releasably engageable with said shoulder, a coil spring confined in said bore and encircling said rod between said coupling and bushing, said bushng having the additional function of a limit stop, the inward end of said rod projecting rearwardly of said bushing and being provided with a sliding guide washer and a resilient collar, said collar providing a shock absorbing bumper and being engageable with said bushing.

6. The implement defined in and according to claim 3, and wherein the aforementioned shock absorbing means comprises a pair of spaced collars encircling a rearward end portion of said inner barrel, a coil spring surrounding that portion of the inner barrel with its ends abutting and held in coacting operative position by said collars, forward and rearward washers also encircling said rearward end portion and retaining said collars in their given positions, at least one of the forward washers, being compressibly resilient, providing a shock absorbing cushion and being adapted to abut an associatively cooperable rearward end of said outer barrel.

7. An animal spearing implement comprising, in combination, an elongated outer barrel open at its forward and rearward ends and defining a cylinder for an inner barrel, the inner end of said outer barrel providing a limit stop, a handgrip fixedly mounted on a median portion of said outer barrel, a portion of said outer barrel forwardly of but adjacent to said handgrip having an elongated guide and keying slot, a cocking sleeve slidable on said outer barrel, said sleeve having an apertured portion providing a keeper shoulder, a spring-biased trigger pivotally bracketed on said outer barrel adjacent and in front of said handgrip and having a finger actuated button overhanging a portion of the handgrip in readiness for trippable use and a latch dog at a forward end releasably engageable with said keeper shoulder, a single elastic tube providing actuating means, said elastic tube being opposed to and cooperable with the slotted portion of said outer barrel, a first post fixed on a forward portion of said outer barrel and on which a forward portion of said elastic tube is anchored, a second post complemental to said first post and on which a rearward portion of said tube is anchored, said second post being mounted on said sleeve and having a portion shiftably keyed and slidable in said slot and having an inner end projecting into the bore of said outer barrel, an inner barrel of a length greater than the length of said outer barrel and fittingly slidable in the bore of the outer barrel and having its forward and rearward ends projecting though and beyond the corresponding ends of said outer barrel, a gig mounted on the projecting forward end, spring-equipped shock-absorbing means mounted exteriorly on the rearward projecting end, and means connecting the projecting inner end of said second post with a cooperating median portion of said inner barrel.

References Cited
UNITED STATES PATENTS

| | | | |
|---|---|---|---|
| 1,727,812 | 9/1929 | David | 43—6 |
| 2,345,043 | 3/1944 | Hall | 43—19 |
| 2,537,754 | 1/1951 | Hanshaw | 43—6 |
| 2,869,273 | 1/1959 | Thorburn | 43—6 |
| 2,932,111 | 4/1960 | Kremski et al. | 43—19 |

WARNER H. CAMP, Primary Examiner